United States Patent
Karns et al.

(10) Patent No.: US 10,569,233 B2
(45) Date of Patent: Feb. 25, 2020

(54) HIGH PERMEANCE AND HIGH SELECTIVITY FACILITATED TRANSPORT MEMBRANES FOR OLEFIN/PARAFFIN SEPARATIONS

(71) Applicant: UOP LLC, Des Plaines, IL (US)

(72) Inventors: Nicole K. Karns, Des Plaines, IL (US); Chunqing Liu, Arlington Heights, IL (US)

(*) Notice: Subject to any disclaimer, the term of this patent is extended or adjusted under 35 U.S.C. 154(b) by 298 days.

(21) Appl. No.: 15/615,134

(22) Filed: Jun. 6, 2017

(65) Prior Publication Data

US 2018/0345230 A1  Dec. 6, 2018

(51) Int. Cl.
| | |
|---|---|
| *B01D 71/68* | (2006.01) |
| *B01D 69/10* | (2006.01) |
| *B01D 53/22* | (2006.01) |
| *B01D 67/00* | (2006.01) |
| *B01D 69/14* | (2006.01) |
| *C10L 3/10* | (2006.01) |
| *B01D 69/02* | (2006.01) |
| *B01D 71/10* | (2006.01) |
| *B01D 71/44* | (2006.01) |

(52) U.S. Cl.
CPC ............ *B01D 71/68* (2013.01); *B01D 53/228* (2013.01); *B01D 67/0088* (2013.01); *B01D 69/10* (2013.01); *B01D 69/148* (2013.01); *C10L 3/104* (2013.01); *B01D 69/02* (2013.01); *B01D 71/10* (2013.01); *B01D 71/44* (2013.01); *B01D 2256/24* (2013.01); *B01D 2256/245* (2013.01); *B01D 2257/504* (2013.01); *B01D 2257/7022* (2013.01); *B01D 2325/34* (2013.01); *C10L 2290/548* (2013.01)

(58) Field of Classification Search
CPC ......... B01D 71/68; B01D 71/28; B01D 53/22
See application file for complete search history.

(56) References Cited

U.S. PATENT DOCUMENTS

| | | | |
|---|---|---|---|
| 3,133,132 A | 5/1964 | Sidney et al. | |
| 5,198,316 A | 3/1993 | Wernet et al. | |
| 5,256,295 A | 10/1993 | Baker et al. | |
| 5,670,051 A | 9/1997 | Pinnau et al. | |
| 6,932,589 B2 | 8/2005 | Suzuki | |
| 7,048,846 B2 | 5/2006 | White et al. | |
| 7,125,935 B2 | 10/2006 | Andrews et al. | |
| 7,361,800 B2 | 4/2008 | Herrera et al. | |
| 7,803,275 B2 | 9/2010 | Partridge et al. | |
| 8,173,323 B2 | 5/2012 | An et al. | |
| 8,337,598 B2 | 12/2012 | Yates et al. | |
| 8,366,804 B2 | 2/2013 | Liu et al. | |
| 8,561,812 B2 | 10/2013 | Liu et al. | |
| 8,574,785 B2 | 11/2013 | Kim et al. | |
| 8,829,059 B2 | 9/2014 | Wynn et al. | |
| 8,912,288 B2 | 12/2014 | Liu et al. | |
| 9,017,451 B2 | 4/2015 | Wynn et al. | |
| 9,126,152 B2 | 9/2015 | Liu et al. | |
| 9,126,154 B2 | 9/2015 | Liu et al. | |
| 9,126,156 B2 | 9/2015 | Liu et al. | |
| 9,211,508 B2 | 12/2015 | Liu et al. | |
| 9,216,390 B2 | 12/2015 | Ho et al. | |
| 9,751,050 B2 | 9/2017 | Zhou et al. | |
| 10,258,929 B2 | 4/2019 | Liu et al. | |
| 2004/0154980 A1 | 8/2004 | Kim et al. | |
| 2004/0215045 A1 | 10/2004 | Herrera et al. | |
| 2006/0000778 A1 | 1/2006 | Childs et al. | |
| 2007/0190385 A1 | 8/2007 | Lee et al. | |
| 2008/0063917 A1 | 3/2008 | Yamashita et al. | |
| 2008/0268314 A1 | 10/2008 | Han et al. | |
| 2009/0277837 A1 | 11/2009 | Liu et al. | |
| 2010/0018926 A1 | 1/2010 | Liu et al. | |
| 2010/0147148 A1 | 6/2010 | Rabiei | |
| 2011/0094960 A1 | 4/2011 | Zhou et al. | |
| 2012/0031833 A1 | 2/2012 | Ho et al. | |
| 2012/0285881 A1 | 11/2012 | Jikihara et al. | |
| 2013/0255483 A1 | 10/2013 | Sanders et al. | |
| 2013/0299428 A1 | 11/2013 | Bikel et al. | |
| 2013/0233791 A1 | 12/2013 | Koo et al. | |

(Continued)

FOREIGN PATENT DOCUMENTS

| | | |
|---|---|---|
| CN | 103402614 A | 11/2013 |
| CN | 104275094 A | 1/2015 |

(Continued)

OTHER PUBLICATIONS

Chen, "Bioinspired fabrication of composite pervaporation membranes with high permeation flux and structural stability", Journal of Membrane Science 344 (2009) 136-143.

Ma, "High-flux thin-film nanofibrous composite ultrafiltration membranes containing cellulose barrier layer", J. Mater. Chem., 2010, 20, 4692-4704 (2010).

Wanichapichart, Characteristics of polyethersulfone/chitosan composite membranes:, Biophysics Unit, Membrane Science and Technology Research Center, Faculty of Science, Prince of Songkia University, Had Yai, Songkhla, Thailand 90112.

Riley, "Thin-Film Composite Membrane for Single-Stage Seawater Desalination by Reverse Osmosis", Applied Polymer Symposium No. 22, pp. 255-267 (1973).

(Continued)

*Primary Examiner* — Youngsul Jeong

(57) ABSTRACT

The invention provides a high permeance and high selectivity facilitated transport membrane comprising a very small pore, nanoporous polyethersulfone (PES)/polyvinylpyrrolidone (PVP) blend support membrane, a hydrophilic polymer inside the very small nanopores on the skin layer surface of the support membrane, a thin, nonporous, hydrophilic polymer layer coated on the surface of the support membrane, and metal salts incorporated in the hydrophilic polymer layer coated on the surface of the support membrane and the hydrophilic polymer inside the very small nanopores, a method of making this membrane, and the use of this membrane for olefin/paraffin separations, particularly for propylene/propane and ethylene/ethane separations.

8 Claims, No Drawings

(56) References Cited

U.S. PATENT DOCUMENTS

| | | |
|---|---|---|
| 2014/0137734 A1 | 5/2014 | Liu et al. |
| 2014/0290478 A1 | 10/2014 | Liu et al. |
| 2015/0025293 A1* | 1/2015 | Feiring .................. B01J 47/12 |
| | | 585/818 |
| 2015/0053079 A1 | 2/2015 | Koros et al. |
| 2015/0068978 A1 | 3/2015 | Lando et al. |
| 2015/0098872 A1 | 4/2015 | Kelly et al. |
| 2016/0107127 A1 | 4/2016 | Lee et al. |
| 2016/0177035 A1 | 6/2016 | Liu et al. |
| 2016/0325229 A1 | 11/2016 | Zhou et al. |
| 2017/0291143 A1 | 10/2017 | Zhou et al. |
| 2017/0354918 A1* | 12/2017 | Liu ....................... B01D 69/12 |
| 2018/0001277 A1 | 1/2018 | Liu et al. |
| 2018/0154311 A1 | 6/2018 | Zhou et al. |
| 2018/0333675 A1 | 11/2018 | Liu et al. |
| 2018/0345230 A1 | 12/2018 | Karns et al. |
| 2019/0060841 A1 | 2/2019 | Liu et al. |

FOREIGN PATENT DOCUMENTS

| | | |
|---|---|---|
| EP | 458598 A2 | 11/1991 |
| EP | 1375459 A1 | 1/2004 |
| EP | 2545985 A1 | 1/2013 |
| EP | 2764908 A1 | 8/2014 |
| WO | 2009002747 A2 | 12/2008 |

OTHER PUBLICATIONS

Hess et al., Prpene/prpane separation with copolyimide membranes containing silver ions, Journal of Membrane Science, vol. 275, issue 1-2, Apr. 20, 2006, pp. 52-60.

PCT Search Report dated Sep. 14, 2017 for PCT Application No. PCT/US2017/038294.

Kang, "Novel Application of Partially Positively Charged Silver Nanoparticles for Facilitated Transport in Olefin/Paraffin Separation Membranes", Chem. Mater. 2008, 20, 1308-1311.

PCT Search Report dated Oct. 5, 2017 for PCT Appl. No. PCT/US2017/038307.

PCT Search Report dated Aug. 30, 2018 for PCT Appl. No. PCT/US2018/032251.

PCT Search Report dated Sep. 14, 2017 for PCT Appl. No. PCT/US2017/036265.

Kudinov, "Separation Characteristics of an Ejector Membrane-Sorption Hybrid System", Theoretical Foundations of Chemical Engineering, 2014, vol. 48, No. 6, 832-836, Pleiades Publishing, Ltd., 2014.

PCT Search Report dated Aug. 30, 2018 for PCT Appl. No. PCT/US2018/035004.

PCT Search Report dated Nov. 29, 2018 for PCT Appl. No. PCT/US2018/047547.

* cited by examiner

HIGH PERMEANCE AND HIGH SELECTIVITY FACILITATED TRANSPORT MEMBRANES FOR OLEFIN/PARAFFIN SEPARATIONS

BACKGROUND OF THE INVENTION

Over 170 Separex™ membrane systems have been installed in the world for gas separation applications such as for the removal of acid gases from natural gas, in enhanced oil recovery, and hydrogen purification. Two new Separex™ membranes (Flux+ and Select) have been commercialized recently by Honeywell UOP, Des Plaines, Ill. for carbon dioxide removal from natural gas. These Separex™ spiral wound membrane systems currently hold the membrane market leadership for natural gas upgrading. These membranes, however, do not have outstanding performance for olefin/paraffin separations. Development of new stable and very high selectivity membranes is critical for the future success of membranes for olefin/paraffin separation applications such as propylene/propane and ethylene/ethane separations.

Light olefins, such as propylene and ethylene, are produced as co-products from a variety of feedstocks in a number of different processes in the chemical, petrochemical, and petroleum refining industries. Various petrochemical streams contain olefins and other saturated hydrocarbons. Typically, these streams are from stream cracking units (ethylene production), catalytic cracking units (motor gasoline production), or the dehydrogenation of paraffins.

Currently, the separation of olefin and paraffin components is performed by cryogenic distillation, which is expensive and energy intensive due to the low relative volatilities of the components. Large capital expense and energy costs have created incentives for extensive research in this area of separations, and low energy-intensive membrane separations have been considered as an attractive alternative.

In principle, membrane-based technologies have the advantages of both low capital cost and high-energy efficiency compared to conventional separation methods for olefin/paraffin separations, such as propylene/propane and ethylene/ethane separations. Four main types of membranes have been reported for olefin/paraffin separations. These are facilitated transport membranes, polymer membranes, mixed matrix membranes, and inorganic membranes. Facilitated transport membranes, or ion exchange membranes, which sometimes use silver ions as a complexing agent, have very high olefin/paraffin separation selectivity. However, poor chemical stability, due to carrier poisoning or loss, high cost, and low flux, currently limit practical applications of facilitated transport membranes.

Separation of olefins from paraffins via conventional polymer membranes has not been commercially successful due to inadequate selectivities and permeabilities of the polymer membrane materials, as well as due to plasticization issues. Polymers that are more permeable are generally less selective than are less permeable polymers. A general trade-off has existed between permeability and selectivity (the so-called "polymer upper bound limit") for all kinds of separations, including olefin/paraffin separations. In recent years, substantial research effort has been directed to overcoming the limits imposed by this upper bound. Various polymers and techniques have been used, but without much success in terms of improving the membrane selectivity.

More efforts have been undertaken to develop metal ion incorporated, high olefin/paraffin selectivity facilitated transport membranes. The high selectivity for olefin/paraffin separations is achieved by the incorporation of metal ions such as silver (I) or copper (I) cations into the solid nonporous polymer matrix layer on top of the highly porous membrane support layer (so-called "fixed site carrier facilitated transport membrane") or directly into the pores of the highly porous support membrane (so-called "supported liquid facilitated transport membrane") that results in the formation of a reversible metal cation complex with the pi bond of olefins, whereas no interaction occurs between the metal cations and the paraffins. Addition of water, plasticizer, or humidification of the olefin/paraffin feed streams to either the fixed site carrier facilitated transport membranes or the supported liquid facilitated transport membranes is usually required to obtain reasonable olefin permeances and high olefin/paraffin selectivities. The performance of fixed site carrier facilitated transport membranes is much more stable than that of the supported liquid facilitated transport membranes and the fixed site carrier facilitated transport membranes are less sensitive to the loss of metal cation carriers than the supported liquid facilitated transport membranes.

Pinnau et al. disclosed a solid polymer electrolyte fixed site carrier facilitated transport membrane comprising silver tetrafluoroborate incorporated poly(ethylene oxide), see U.S. Pat. No. 5,670,051. Herrera et al. disclosed a process for the separation of olefin/paraffin mixtures using a silver cation-chelated chitosan fixed site carrier facilitated transport membrane, see U.S. Pat. No. 7,361,800. Herrera et al. disclosed the coating of a layer of chitosan on the surface of a microporous support membrane, wherein the support membrane is made from polyesters, polyamides, polyimides, polyvinylidene fluoride, polyacrylonitrile, polysulfones or polycarbonates.

Feiring et al. disclosed a new facilitated transport membrane comprising silver (I) cation exchanged fluorinated copolymer synthesized from a perfluorinated cyclic or cyclizable monomer and a strong acid highly fluorinated vinylether compound, see US 2015/0025293.

The composite facilitated transport membranes disclosed in the literature comprise an ultrafiltration or microfiltration membrane as the support membrane. Development of new stable, high permeance, and high selectivity facilitated transport membranes is still required for the use of membranes for olefin/paraffin separations such as propylene/propane and ethylene/ethane separations.

SUMMARY OF THE INVENTION

This invention provides a new high permeance and high selectivity facilitated transport membrane comprising a very small pore, nanoporous polyethersulfone (PES)/polyvinylpyrrolidone (PVP) blend support membrane, a hydrophilic polymer inside the very small nanopores on the skin layer surface of the support membrane, a thin, nonporous, hydrophilic polymer layer coated on the surface of the support membrane, and metal salts incorporated in the hydrophilic polymer layer coated on the surface of the support membrane and the hydrophilic polymer inside the very small nanopores, a method of making this membrane, and the use of this membrane for olefin/paraffin separations, particularly for propylene/propane (C3=/C3) and ethylene/ethane (C2=/C2) separations.

The very small pore, nanoporous PES/PVP blend support membrane used for the preparation of the high permeance and high selectivity facilitated transport membranes disclosed in the present invention comprises a relatively hydrophilic PES polymer and a hydrophilic PVP polymer. The addition of hydrophilic PVP polymer to the very small pore, nanoporous support membrane resulted in improved membrane hydrophilicity, improved solavation of the metal salts such as silver nitrate ($AgNO_3$) in the membrane, and therefore significantly improved membrane permeance and high stability for the facilitated transport membrane for olefin/paraffin separations. It is preferred that the hydrophilic PVP polymer has a weight average molecular weight of 40 k or higher.

The very small pore, nanoporous PES/PVP blend support membrane described in the current invention has an average pore diameter of less than 10 nm on the membrane skin layer surface. The very small pore, nanoporous PES/PVP blend support membrane described in the current invention is an asymmetric integrally skinned membrane.

The hydrophilic polymer inside the very small nanopores on the surface of the very small pore, nanoporous PES/PVP blend support membrane of the facilitated transport membrane described in the current invention can be selected from, but is not limited to, a group of hydrophilic polymers containing chitosan, sodium carboxylmethyl-chitosan, carboxylmethyl-chitosan, hyaluronic acid, sodium hyaluronate, carbopol, polycarbophil calcium, poly(acrylic acid) (PAA), poly(methacrylic acid) (PMA), sodium alginate, alginic acid, poly(vinyl alcohol) (PVA), poly(ethylene oxide) (PEO), poly(ethylene glycol) (PEG), poly(vinylpyrrolidone) (PVP), gelatin, carrageenan, sodium lignosulfonate, and mixtures thereof.

The thin, nonporous, hydrophilic polymer layer coated on the surface of the very small pore, nanoporous PES/PVP blend support membrane of the facilitated transport membrane comprises a hydrophilic polymer selected from, but not limited to, a group of hydrophilic polymers containing chitosan, sodium carboxylmethyl-chitosan, carboxylmethyl-chitosan, hyaluronic acid, sodium hyaluronate, carbopol, polycarbophil calcium, PAA, PMA, sodium alginate, alginic acid, PVA, PEO, PEG, PVP, gelatin, carrageenan, sodium lignosulfonate, and mixtures thereof. The hydrophilic polymer in the thin, nonporous, hydrophilic polymer layer coated on the surface of said very small pore, nanoporous PES/PVP blend support membrane and the hydrophilic polymer inside the very small nanopores on the surface of the very small pore, nanoporous PES/PVP blend support membrane can be selected from the same hydrophilic polymer or different hydrophilic polymers. Preferably, the hydrophilic polymer in the thin, nonporous, hydrophilic polymer layer coated on the surface of said very small pore, nanoporous PES/PVP blend support membrane and the hydrophilic polymer inside the very small nanopores on the surface of said very small pore, nanoporous PES/PVP blend support membrane are selected from different hydrophilic polymers. As an example, in a particular embodiment of the invention, the hydrophilic polymer in the thin, nonporous, hydrophilic polymer layer coated on the surface of the very small pore, nanoporous PES/PVP blend support membrane described in the current invention is chitosan and the hydrophilic polymer inside the very small nanopores on the surface of the very small pore, nanoporous PES/PVP blend support membrane is sodium alginate or sodium hyaluronate.

The metal salts incorporated in the hydrophilic polymer layer coated on the surface of said support membrane and said hydrophilic polymer inside the very small nanopores of the facilitated transport membrane are preferably silver salts or copper salts, such as silver(I) nitrate or copper(I) chloride.

Olefin/paraffin permeation experimental results demonstrated that the addition of the hydrophilic PVP polymer to the PES porous support membrane is critical to achieve high olefin permeance and high performance stability for olefin/paraffin separations.

The present invention provides a process to treat a gaseous feed stream comprising from 99 to 1 mol % of one or more C2-C8 olefins and from 1 to 99 mol % of one or more C1-C8 paraffins, the process comprising passing the gaseous feed stream to a feed side of a facilitated transport membrane comprising a very small pore, nanoporous PES/PVP blend support membrane, a hydrophilic polymer inside the very small nanopores on the skin layer surface of said support membrane, a thin, nonporous, hydrophilic polymer layer coated on the surface of said support membrane, and metal salts incorporated in the hydrophilic polymer layer coated on the surface of the support membrane and the hydrophilic polymer inside the very small nanopores, so that not less than 80 mol % of the olefins in said feed stream pass through the facilitated transport membrane and recovering a permeate stream comprising not less than 90 mol % of olefin and not more than 10 mol % of paraffin.

The facilitated transport membrane comprising a very small pore, nanoporous PES/PVP blend support membrane, a hydrophilic polymer inside the very small nanopores on the skin layer surface of said support membrane, a thin, nonporous, hydrophilic polymer layer coated on the surface of said support membrane, and metal salts incorporated in the membrane disclosed in the present invention showed high propylene permeance of ≥80 GPU, high propylene/propane selectivity of ≥200, and stable performance with time for propylene/propane separation at 50° C. under 100 psig, 70 mol % propylene/30 mol % propane vapor feed pressure.

DETAILED DESCRIPTION OF THE INVENTION

Membrane technology has been of great interest for the separation of olefin/paraffin mixtures. However, despite significant research effort on olefin/paraffin separations by membrane technology, no commercial olefin/paraffin separation application using membranes has been reported so far.

This invention discloses a new high permeance and high selectivity facilitated transport membrane comprising a very small pore, nanoporous polyethersulfone (PES)/polyvinylpyrrolidone (PVP) blend support membrane, a hydrophilic polymer inside the very small nanopores on the skin layer surface of the support membrane, a thin, nonporous, hydrophilic polymer layer coated on the surface of the support membrane, and metal salts incorporated in the hydrophilic polymer layer coated on the surface of the support membrane and the hydrophilic polymer inside the very small nanopores, a method of making this membrane, and the use of this membrane for olefin/paraffin separations, particularly for C3=/C3 and C2=/C2 separations.

The very small pore, nanoporous PES/PVP blend support membrane used for the preparation of the high permeance and high selectivity facilitated transport membranes disclosed in the present invention comprises a relatively hydrophilic PES polymer and a hydrophilic PVP polymer. The addition of hydrophilic PVP polymer to the very small pore, nanoporous support membrane resulted in improved membrane hydrophilicity, improved adhesion between the support membrane and the thin, nonporous, hydrophilic polymer layer coated on the surface of the support membrane, improved solavation of the metal salts such as $AgNO_3$ in the membrane, and therefore significantly improved membrane permeance and stability of the facilitated transport membrane for olefin/paraffin separations. It is preferred that the hydrophilic PVP polymer has a weight average molecular weight of 40 k or higher. It is also preferred that the weight ratio of PES polymer to PVP polymer in the very small pore, nanoporous PES/PVP blend support membrane is in a range of 20:1 to 2:1.

The very small pore, nanoporous PES/PVP blend support membrane described in the current invention has an average pore diameter of less than 10 nm on the membrane skin layer surface. The formation of the very small pores with the average pore diameter of less than 10 nm on the membrane skin layer surface is controlled by the membrane fabrication process conditions and the polymer casting dope formula comprising PES, PVP, solvents that can dissolve PES and PVP, and non-solvents that cannot dissolve PES and PVP. The very small pore, nanoporous PES/PVP blend support membrane described in the current invention is an asymmetric integrally skinned membrane with either flat sheet (spiral wound) or hollow fiber membrane geometry.

The hydrophilic polymer inside the very small nanopores on the surface of the very small pore, nanoporous PES/PVP blend support membrane of the facilitated transport membrane described in the current invention can be selected from, but is not limited to, a group of hydrophilic polymers containing chitosan, sodium carboxylmethyl-chitosan, carboxylmethyl-chitosan, hyaluronic acid, sodium hyaluronate, carbopol, polycarbophil calcium, poly(acrylic acid) (PAA), poly(methacrylic acid) (PMA), sodium alginate, alginic acid, poly(vinyl alcohol) (PVA), poly(ethylene oxide) (PEO), poly(ethylene glycol) (PEG), poly(vinylpyrrolidone) (PVP), gelatin, carrageenan, sodium lignosulfonate, and mixtures thereof. Preferably, the hydrophilic polymer inside the very small nanopores on the surface of the very small pore, nanoporous PES/PVP blend support membrane of the facilitated transport membrane described in the current invention is selected from chitosan, sodium hyaluronate, sodium alginate, gelatin, carrageenan, and mixtures thereof.

The dried very small pore, nanoporous PES/PVP blend support membrane comprising hydrophilic polymers inside the very small nanopores on the membrane surface described in the present invention has a carbon dioxide permeance of ≤700 GPU and a carbon dioxide/methane selectivity of <5 at 50° C. under 500-1000 psig, 10% $CO_2$/90% $CH_4$ mixed gas feed pressure.

The thin, nonporous, hydrophilic polymer layer coated on the surface of the very small pore, nanoporous PES/PVP blend support membrane of the facilitated transport membrane comprises a hydrophilic polymer selected from, but not limited to, a group of hydrophilic polymers containing chitosan, sodium carboxylmethyl-chitosan, carboxylmethyl-chitosan, hyaluronic acid, sodium hyaluronate, carbopol, polycarbophil calcium, PAA, PMA, sodium alginate, alginic acid, PVA, PEO, PEG, PVP, gelatin, carrageenan, sodium lignosulfonate, and mixtures thereof. The hydrophilic polymer in the thin, nonporous, hydrophilic polymer layer coated on the surface of said very small pore, nanoporous PES/PVP blend support membrane and the hydrophilic polymer inside the very small nanopores on the surface of the very small pore, nanoporous PES/PVP blend support membrane can be selected from the same hydrophilic polymer or different hydrophilic polymers. Preferably, the hydrophilic polymer in the thin, nonporous, hydrophilic polymer layer coated on the surface of said very small pore, nanoporous PES/PVP blend support membrane and the hydrophilic polymer inside the very small nanopores on the surface of said very small pore, nanoporous PES/PVP blend support membrane are selected from different hydrophilic polymers. As an example, in a particular embodiment of the invention, the hydrophilic polymer in the thin, nonporous, hydrophilic polymer layer coated on the surface of the very small pore, nanoporous PES/PVP blend support membrane described in the current invention is chitosan and the hydrophilic polymer inside the very small nanopores on the surface of the very small pore, nanoporous PES/PVP blend support membrane is sodium alginate or sodium hyaluronate. The chitosan polymer and the sodium alginate or sodium hyaluronate form polyelectrolyte complex.

The metal salts incorporated in the hydrophilic polymer layer coated on the surface of said support membrane and said hydrophilic polymer inside the very small nanopores of the facilitated transport membrane are preferably silver salts or copper salts, such as silver(I) nitrate or copper(I) chloride. The metal cations such as silver cations on the metal salts incorporated in the hydrophilic polymer layer coated on the surface of the support membrane, the hydrophilic polymer inside the very small nanopores on the skin layer surface of the support membrane, and the hydrophilic PVP polymer in the support membrane of the facilitated transport membrane in the current invention form reversible metal cation complexes with the pi bonds of olefins, whereas no interactions occur between the metal cations and the paraffins in the facilitated transport membrane described in the present invention. Therefore, the high permeance and high selectivity facilitated transport membrane comprising a very small pore, nanoporous PES/PVP blend support membrane, a hydrophilic polymer inside the very small nanopores on the skin layer surface of the support membrane, a thin, nonporous, hydrophilic polymer layer coated on the surface of the support membrane, and metal salts incorporated in the hydrophilic polymer layer coated on the surface of the support membrane and the hydrophilic polymer inside the very small nanopores described in the present invention can provide both high selectivity and high permeance for olefin/paraffin separations.

The current invention discloses the use of a relatively hydrophilic, very small pore, nanoporous PES/PVP polymer blend support membrane with an average pore diameter of less than 10 nm on the membrane skin layer surface for the preparation of the new facilitated transport membrane. The present invention teaches the incorporation of hydrophilic PVP polymer to the PES porous support membrane to achieve high olefin permeance and high performance stability for olefin/paraffin separations. The addition of hydrophilic PVP polymer to the PES porous support membrane improved membrane hydrophilicity, adhesion between the support membrane and the hydrophilic polymer inside the very small nanopores on the surface of the support membrane, adhesion between the support membrane and the thin, nonporous, hydrophilic polymer layer coated on the surface of the support membrane, and the solavation of the metal salts such as $AgNO_3$ in the membrane, and therefore significantly improved membrane permeance and high stability for the facilitated transport membrane for olefin/paraffin separations.

The use of the very small pore, nanoporous support membrane comprising hydrophilic PVP polymer in the support membrane and hydrophilic polymers inside the very small nanopores on the support membrane surface for the preparation of the new facilitated transport membrane comprising metal salts in the present invention prevents the easy diffusion and transportation of the metal salt carriers from the hydrophilic polymer layer coated on the surface of the support membrane and the hydrophilic polymer inside the very small nanopores to the large pores underneath the very small nanopores of the support membrane, which will result in the loss of the metal salt carriers from the facilitated transport membrane under pressure. Therefore, the new facilitated transport membrane disclosed in the present invention provides high olefin/paraffin selectivity and high performance stability for olefin/paraffin separations. The dried very small pore, nanoporous PES/PVP blend support membrane comprising hydrophilic polymers inside the very small nanopores on the membrane surface described in the present invention has a carbon dioxide permeance of ≤700 GPU and a carbon dioxide/methane selectivity of <5 at 50° C. under 500-1000 psig, 10% $CO_2$/90% $CH_4$ mixed gas feed pressure.

The present invention discloses a method of making the high permeance and high selectivity facilitated transport membrane comprising a very small pore, nanoporous PES/PVP blend support membrane, a hydrophilic polymer inside the very small nanopores on the skin layer surface of the support membrane, a thin, nonporous, hydrophilic polymer layer coated on the surface of the support membrane, and metal salts incorporated in the hydrophilic polymer layer coated on the surface of the support membrane and the hydrophilic polymer inside the very small nanopores. The method comprises: (a) Preparation of a very small pore, nanoporous PES/PVP blend support membrane comprising hydrophilic polymers inside the very small nanopores on the skin layer surface of said support membrane via a phase inversion membrane casting or spinning fabrication process, wherein the incorporation of the hydrophilic PVP polymer into the support membrane is accomplished by adding PVP polymer with certain weight ratio to PES polymer to the PES casting or spinning dopes and wherein the incorporation of the hydrophilic polymers into the very small nanopores on the skin layer surface of said PES/PVP blend support membrane is accomplished by the nipping of an aqueous solution of a hydrophilic polymer with a concentration in a range of 0.05 wt % to 5 wt % at the end of the membrane casting or spinning fabrication process or via the addition of the hydrophilic polymer to the gelation water tank during the membrane casting or spinning fabrication process; (b) Coating a thin, nonporous, hydrophilic polymer layer on the skin layer surface of said relatively hydrophilic, very small pore, nanoporous support membrane comprising hydrophilic polymers inside the very small nanopores on the skin layer surface via any coating method such as dip-coating or meniscus coating method using an aqueous solution of the hydrophilic polymer with a concentration in a range of 0.2 wt % to 10 wt %; (c) Preparation of the facilitated transport membrane by soaking the thin, nonporous, hydrophilic polymer layer coated on the skin layer surface of said relatively hydrophilic, very small pore, nanoporous PES/PVP blend support membrane comprising hydrophilic polymers inside the very small nanopores on the skin layer surface in an aqueous solution of a metal salt such as silver nitrate ($AgNO_3$) with a concentration in a range of 0.2M to 10M for a certain time in a range from 1 min to 48 h. To prepare the relatively hydrophilic, very small pore, nanoporous PES/PVP blend support membrane in step (a), a membrane casting or spinning dope comprising PES polymer, PVP polymer, a solvent such as a mixture of N-methyl-2-pyrrolidone (NMP) and 1,3-dioxolane, a non-solvents such as an alcohol or a hydrocarbon, and an additive such as glycerol is used in the present invention. The addition of a hydrocarbon non-solvent such as n-hexane, n-heptane, n-decane or n-octane and a pore forming agent such as glycerol to the membrane casting or spinning dope formula is the key for the formation of very small nanopores with an average pore diameter of less than 10 nm on the membrane skin layer surface of the very small pore, nanoporous PES/PVP support membrane.

The new facilitated transport membranes comprising a very small pore, nanoporous PES/PVP blend support membrane, a hydrophilic polymer inside the very small nanopores on the skin layer surface of the support membrane, a thin, nonporous, hydrophilic polymer layer coated on the surface of the support membrane, and metal salts incorporated in the hydrophilic polymer layer coated on the surface of the support membrane and the hydrophilic polymer inside the very small nanopores described in the present invention can be fabricated into any convenient form suitable for a desired olefin/paraffin application. For example, the membranes can be in the form of hollow fibers, tubes, flat sheets, and the like. The facilitated transport membrane in the present invention can be assembled in a separator in any suitable configuration for the form of the membrane and the separator may provide for co-current, counter-current, or cross-current flows of the feed on the retentate and permeate sides of the membrane. In one exemplary embodiment, the facilitated transport membrane described in the present invention is in a spiral wound module that is in the form of flat sheet having a thickness from about 30 to about 400 μm. In another exemplary embodiment, the facilitated transport membrane described in the present invention is in a hollow fiber module that is in the form of thousands, tens of thousands, hundreds of thousands, or more, of parallel, closely-packed hollow fibers or tubes. In one embodiment, each fiber has an outside diameter of from about 200 micrometers (μm) to about 700 millimeters (mm) and a wall thickness of from about 30 to about 200 μm. In operation, a feed contacts a first surface of said facilitated transport membrane described in the present invention, a permeate permeates said facilitated transport membrane described in the present invention and is removed therefrom, and a retentate, not having permeated said facilitated transport membrane described in the present invention, also is removed therefrom. In another embodiment, the facilitated transport membrane described in the present invention can be in the form of flat sheet having a thickness in the range of from about 30 to about 400 μm.

The present invention provides a process for the separation of paraffin and olefin, such as, for example, in gaseous streams comprising from 99 to 1 mol % of one or more C2-C8 olefins and from 1 to 99 mol % of one or more C1-C8 paraffins produced from stream cracking, catalytic cracking, the dehydration of paraffins, and the like using the new facilitated transport membrane comprising a very small pore, nanoporous PES/PVP blend support membrane, a hydrophilic polymer inside the very small nanopores on the skin layer surface of the support membrane, a thin, nonporous, hydrophilic polymer layer coated on the surface of the support membrane, and metal salts incorporated in the hydrophilic polymer layer coated on the surface of the support membrane and the hydrophilic polymer inside the very small nanopores in the present invention, said process comprising passing said gaseous feed stream to a feed side of the facilitated transport membrane, so that not less than 80 mol % of the olefins in said feed stream pass through said facilitated transport membrane and recovering a permeate stream comprising not less than 90 mol % of olefin and not more than 10 mol % of paraffin. The process utilizes the new facilitated transport membrane described in the present invention that is highly permeable but also highly selective to olefin, thus permitting olefin to permeate the membrane at a much higher rate than the paraffin. The facilitated transport membrane comprising a very small pore, nanoporous PES/PVP blend support membrane, a hydrophilic polymer inside the very small nanopores on the skin layer surface of the support membrane, a thin, nonporous, hydrophilic polymer layer coated on the surface of the support membrane, and metal salts incorporated in the hydrophilic polymer layer coated on the surface of the support membrane and the hydrophilic polymer inside the very small nanoporesdescribed in the present invention can take a variety of forms suitable for a particular application. For example, the membrane can be in the form of a flat sheet, hollow tube or fiber, and the like. In this regard, various embodiments of the process contemplated herein can be used to replace C2 and C3 splitters, as hybrid membrane/distillation units for olefin purification, for recovery of olefins from polypropylene vent streams or from fluid catalytic cracking (FCC) off-gas streams, or the like. The process can also be used for the production of polymer grade propylene, thus offering significant energy, capital, and operating cost savings compared to conventional distillation.

The olefin/paraffin separation process using the facilitated transport membrane described in the present invention starts by contacting a first surface of the membrane with an olefin/paraffin feed. The olefin may comprise, for example, propylene or ethylene and the paraffin may comprise propane or ethane, respectively. The olefin/paraffin feed comprises a first concentration of olefin and a first concentration of paraffin depending on the application for which the membrane separation is used. For example, a propane dehydrogenation process typically provides a feed containing about 35 mass percent propylene, whereas a feed from an FCC unit generally contains about 75 mass percent propylene. The flow rate and temperature of the olefin/paraffin feed have those values that are suitable for a desired application. Next, a permeate is caused to flow through the membrane and from a second surface of the membrane. Because the facilitated transport membrane described in the present invention for olefin/paraffin separations is much more selective to the olefin than to the paraffin, the permeate has a concentration of olefin that is much higher than the concentration of the paraffin in the permeate. In one exemplary embodiment, the concentration of the olefin in the permeate is 99.5-99.9 mass percent. In addition, while some paraffin may permeate through the membrane, the permeate has a concentration of paraffin that is much less than the concentration of the paraffin in the feed. The permeate can then be removed from the second surface of the membrane. As the permeate passes through the membrane, a retentate or residue, which has not permeated the membrane, is removed from the first surface of the membrane. The retentate has a concentration of olefin that is much lower than the concentration of olefin in the feed and much lower than the concentration of the permeate. The retentate also has a concentration of paraffin that is higher than a concentration of paraffin that is in the feed.

EXAMPLES

The following examples are provided to illustrate one or more preferred embodiments of the invention, but are not limited embodiments thereof. Numerous variations can be made to the following examples that lie within the scope of the invention.

Example 1

PES/PVP-2.5-1-Na-A-C-AgNO$_3$ Facilitated Transport Membrane

A very small pore, nanoporous, asymmetric polyethersulfone (PES)/polyvinylpyrrolidone (PVP) blend support membrane was prepared via the phase-inversion process. A membrane casting dope comprising, by approximate weight percentages, PES (E6020P, BASF) 15-20%, PVP (40 k Mw) 3-10% (PES/PVP=2.5:1 weight ratio), N-methyl pyrrolidone (NMP) 55-65%, 1,3-dioxolane 5-15%, glycerol 1-10% and n-decane 0.5-2% was cast on a nylon fabric then gelled by immersion in a 1° C. water bath for about 10 minutes, and then annealed in a hot water bath at 85° C. for about 5 minutes. A dilute aqueous solution of sodium alginate was applied via a nipping method onto the surface of the wet, relatively hydrophilic, very small pore, nanoporous, asymmetric PES/PVP(2.5:1) blend support membrane. The wet membrane comprising sodium alginate within the very small nanopores on the membrane skin layer surface was coated with a solution of chitosan dissolved in a dilute, aqueous acetic acid solution and then dried at 50° C. to form a thin, nonporous, chitosan layer on the surface of the membrane. The membrane was then treated with a basic sodium hydroxide solution, washed with water to form the PES/PVP(2.5:1) blend support membrane comprising alginic acid within the very small nanopores on the membrane skin layer surface and a thin, nonporous, chitosan layer on the surface of the membrane. The membrane was then impregnated with a silver nitrate aqueous solution (3M in H$_2$O) to form the final facilitated transport membrane (abbreviated as PES/PVP-2.5-1-Na-A-C-AgNO$_3$). The membrane was then tested with a humidified (relative humidity 80-100%) propylene/propane (C$_3$$_=$/C$_3$) gas mixture (70% C$_3$$_=$/30% C$_3$) at 791 kPa (100 psig), 50° C. with 708 scc/min retentate flow rate. The performance of PES/PVP-2.5-1-Na-A-C-AgNO$_3$ is shown in TABLE 1. PES/PVP-2.5-1-Na-A-C-AgNO$_3$ showed a propylene permeance of 110.7 GPU and a high propylene/propane selectivity of 414 after 3 h of testing. The PES/PVP-2.5-1-Na-A-C-AgNO$_3$ membrane also showed both higher propylene permeance (141.8 GPU) and higher propylene/propane selectivity (697) when the retentate flow rate was increased from 708 scc/min to 1416 scc/min as shown in TABLE 1.

Example 2

PES/PVP-4-1-Na-A-C-AgNO$_3$ Facilitated Transport Membrane

A very small pore, nanoporous, asymmetric polyethersulfone (PES)/polyvinylpyrrolidone (PVP) blend support membrane was prepared via the phase-inversion process. A membrane casting dope comprising, by approximate weight percentages, PES (E6020P, BASF) 15-25%, PVP (40 k Mw) 3-10% (PES/PVP=4:1 weight ratio), N-methyl pyrrolidone (NMP) 55-65%, 1,3-dioxolane 5-15%, glycerol 1-10% and n-decane 0.5-2% was cast on a nylon fabric then gelled by immersion in a 1° C. water bath for about 10 minutes, and then annealed in a hot water bath at 85° C. for about 5 minutes. A dilute aqueous solution of sodium alginate was applied via a nipping method onto the surface of the wet, relatively hydrophilic, very small pore, nanoporous, asymmetric PES/PVP(4:1) blend support membrane. The wet membrane comprising sodium alginate within the very small nanopores on the membrane skin layer surface was coated with a solution of chitosan dissolved in a dilute, aqueous acetic acid solution and then dried at 50° C. to form a thin, nonporous, chitosan layer on the surface of the membrane. The membrane was then treated with a basic sodium hydroxide solution, washed with water to form the PES/PVP(4:1) blend support membrane comprising alginic acid within the very small nanopores on the membrane skin layer surface and a thin, nonporous, chitosan layer on the surface of the membrane. The membrane was then impregnated with a silver nitrate aqueous solution (3M in $H_2O$) to form the final facilitated transport membrane (abbreviated as PES/PVP-4-1-Na-A-C-AgNO$_3$).

Comparative Example 1

PES-Na-A-C-AgNO$_3$ Facilitated Transport Membrane

A facilitated transport membrane (PES-Na-A-C-AgNO$_3$) was prepared in the same method as EXAMPLE 1 except no hydrophilic PVP was added for the preparation of the very small pore, nanoporous, asymmetric PES support membrane. The PES-Na-A-C-AgNO$_3$ membrane was then tested with a humidified (relative humidity 80-100%) propylene/propane ($C_3$_/$C_3$) gas mixture (70% $C_3$_/30% $C_3$) at 791 kPa (100 psig), 50° C. with 708 scc/min retentate flow rate and showed propylene permeance of 74.0 GPU and propylene/propane selectivity of >1000 after 1 h of testing. The PES/PVP-2.5-1-Na-A-C-AgNO$_3$ membrane described in the current invention showed much higher propylene permeance than the comparative PES-Na-A-C-AgNO$_3$ membrane.

TABLE 1

PES/PVP-2.5-1-Na—A—C—AgNO$_3$ and PES-Na—A—C—AgNO$_3$ Facilitated Transport Membranes for Propylene/Propane Separation

| Facilitated Transport Membrane | Testing time (h) | $P_{C3}$_/L (GPU) | $\alpha_{C3-/C3}$ |
|---|---|---|---|
| PES-Na—A—C—AgNO$_3$ [a] | 1 | 74.0 | >1000 |
| PES/PVP-2.5-1-Na—A—C—AgNO$_3$ [a] | 3 | 110.8 | 414 |
| PES/PVP-2.5-1-Na—A—C—AgNO$_3$ [a] | 4 | 110.7 | 418 |
| PES/PVP-2.5-1-Na—A—C—AgNO$_3$ [b] | 6 | 141.8 | 697 |

Tested at 50° C., 791 kPa (100 psig) propylene/propane (70%/30%) mixed vapor feed pressure; feed stream was bubbled through water at 50° C.;
[a] retentate flow rate was set at 708 scc/min;
[b] retentate flow rate was set at 1416 scc/min; 1 GPU = $10^{-6}$ cm$^3$ (STP)/cm$^2$ s (cm Hg).

Specific Embodiments

While the following is described in conjunction with specific embodiments, it will be understood that this description is intended to illustrate and not limit the scope of the preceding description and the appended claims.

A first embodiment of the invention is a facilitated transport membrane comprising a nanoporous polyethersulfone/olyvinylpyrrolidone blend support membrane, a hydrophilic polymer inside nanopores of the support membrane, a hydrophilic polymer coating layer on a surface of the support membrane and metal salts in the hydrophilic polymer coating layer and in the hydrophilic polymer inside the nanopores of the support membrane. An embodiment of the invention is one, any or all of prior embodiments in this paragraph up through the first embodiment in this paragraph wherein the polyvinylpyrrolidone has a weight average molecular weight of 40,000 or higher. An embodiment of the invention is one, any or all of prior embodiments in this paragraph up through the first embodiment in this paragraph wherein the polyethersulfone/polyvinylpyrrolidone blend support membrane has pores with an average pore diameter of less than 10 nm on a membrane skin layer surface. An embodiment of the invention is one, any or all of prior embodiments in this paragraph up through the first embodiment in this paragraph wherein the polyethersulfone to the polyvinylpyrrolidone weight ratio is in a range of 201 to 21. An embodiment of the invention is one, any or all of prior embodiments in this paragraph up through the first embodiment in this paragraph wherein the hydrophilic polymer inside the nanopores of the support membrane are selected from the group consisting of chitosan, sodium carboxylmethyl-chitosan, carboxylmethyl-chitosan, hyaluronic acid, sodium hyaluronate, carbopol, polycarbophil calcium, poly(acrylic acid) (PAA), poly(methacrylic acid) (PMA), sodium alginate, alginic acid, poly(vinyl alcohol) (PVA), poly(ethylene oxide) (PEO), poly(ethylene glycol) (PEG), poly(vinylpyrrolidone) (PVP), gelatin, carrageenan, sodium lignosulfonate, and mixtures thereof. An embodiment of the invention is one, any or all of prior embodiments in this paragraph up through the first embodiment in this paragraph wherein in the nanoporous polyethersulfone/polyvinylpyrrolidone blend support membrane comprising hydrophilic polymers inside the nanopores on the membrane surface has a carbon dioxide permeance of ≤700 GPU and a carbon dioxide/methane selectivity of <5 at 50° C. under 500-1000 psig 10% $CO_2$/90% $CH_4$ mixed gas feed pressure. An embodiment of the invention is one, any or all of prior embodiments in this paragraph up through the first embodiment in this paragraph wherein the hydrophilic polymer coating layer on the surface of the nanoporous polyethersulfone/polyvinylpyrrolidone blend support membrane of the facilitated transport membrane comprises a hydrophilic polymer selected from the group consisting of chitosan, sodium carboxylmethyl-chitosan, carboxylmethyl-chitosan, hyaluronic acid, sodium hyaluronate, carbopol, polycarbophil calcium, poly(acrylic acid) (PAA), poly(methacrylic acid) (PMA), sodium alginate, alginic acid, poly(vinyl alcohol) (PVA), poly(ethylene oxide) (PEO), poly(ethylene glycol) (PEG), poly(vinylpyrrolidone) (PVP), gelatin, carrageenan, sodium lignosulfonate, and mixtures thereof. An embodiment of the invention is one, any or all of prior embodiments in this paragraph up through the first embodiment in this paragraph wherein the metal salts are silver salts or copper salts. An embodiment of the invention is one, any or all of prior embodiments in this paragraph up through the first embodiment in this paragraph wherein the hydrophilic polymer in the hydrophilic polymer coating layer on the surface of the nanoporous polyethersulfone/polyvinylpyrrolidone blend support membrane is chitosan and the hydrophilic polymer inside the nanopores on the surface of the nanoporous polyethersulfone/polyvinylpyrrolidone blend support membrane is sodium alginate or sodium hyaluronate.

A second embodiment of the invention is a process to treat a gaseous feed stream comprising passing the gaseous feed stream comprising from 99 to 1 mol % of one or more C2-C8 olefins and from 1 to 99 mol % of one or more C1-C8 paraffins to a feed side of a facilitated transport membrane comprising a nanoporous polyethersulfone/polyvinylpyrrolidone blend support membrane, a hydrophilic polymer inside the nanopores on the skin layer surface of the support membrane, a hydrophilic polymer coating layer on the surface of the support membrane, and metal salts incorporated in the hydrophilic polymer layer coated on the surface of the support membrane and the hydrophilic polymer inside the nanopores on the skin layer surface of the support membrane, so that not less than 80 mol % of the olefins in the gaseous feed stream pass through the facilitated transport membrane and then recovering a permeate stream comprising not less than 90 mol % of the one or more C2-C8 olefins and not more than 10 mol % of the C1-C8 paraffins. An embodiment of the invention is one, any or all of prior embodiments in this paragraph up through the second embodiment in this paragraph wherein the hydrophilic polymer inside the nanopores of the support membrane are selected from the group consisting of chitosan, sodium carboxylmethyl-chitosan, carboxylmethyl-chitosan, hyaluronic acid, sodium hyaluronate, carbopol, polycarbophil calcium, poly(acrylic acid) (PAA), poly(methacrylic acid) (PMA), sodium alginate, alginic acid, poly(vinyl alcohol) (PVA), poly(ethylene oxide) (PEO), poly(ethylene glycol) (PEG), poly(vinylpyrrolidone) (PVP), gelatin, carrageenan, sodium lignosulfonate, and mixtures thereof. An embodiment of the invention is one, any or all of prior embodiments in this paragraph up through the second embodiment in this paragraph wherein the nanoporous polyethersulfone/polyvinylpyrrolidone blend support membrane comprising hydrophilic polymers inside the nanopores on the membrane surface has a carbon dioxide permeance of ≤700 GPU and a carbon dioxide/methane selectivity of <5 at 50° C. under 500-1000 psig 10% $CO_2$/90% $CH_4$ mixed gas feed pressure. An embodiment of the invention is one, any or all of prior embodiments in this paragraph up through the second embodiment in this paragraph wherein the hydrophilic polymer coating layer on the surface of the nanoporous polyethersulfone/polyvinylpyrrolidone blend support membrane of the facilitated transport membrane comprises a hydrophilic polymer selected from the group consisting of chitosan, sodium carboxylmethyl-chitosan, carboxylmethyl-chitosan, hyaluronic acid, sodium hyaluronate, carbopol, polycarbophil calcium, poly(acrylic acid) (PAA), poly(methacrylic acid) (PMA), sodium alginate, alginic acid, poly(vinyl alcohol) (PVA), poly(ethylene oxide) (PEO), poly(ethylene glycol) (PEG), poly(vinylpyrrolidone) (PVP), gelatin, carrageenan, sodium lignosulfonate, and mixtures thereof. An embodiment of the invention is one, any or all of prior embodiments in this paragraph up through the second embodiment in this paragraph wherein the metal salts are silver salts or copper salts.

The invention claimed is:

1. A facilitated transport membrane comprising: (i) a nanoporous polyethersulfone/polyvinylpyrrolidone blend support membrane; (ii) a hydrophilic polymer inside nanopores of said support membrane; (iii) a hydrophilic polymer coating layer on a surface of the support membrane; and (iv) metal salts in said hydrophilic polymer coating layer and in said hydrophilic polymer inside said nanopores of said support membrane, wherein said polyvinylpyrrolidone has a weight average molecular weight of 40,000 or higher.

2. The facilitated transport membrane of claim 1 wherein said polyethersulfone/ polyvinylpyrrolidone blend support membrane has pores with an average pore diameter of less than 10 nm on a membrane skin layer surface.

3. The facilitated transport membrane of claim 1 wherein said polyethersulfone to said polyvinylpyrrolidone weight ratio in the support membrane is in a range of 20:1 to 2:1.

4. The facilitated transport membrane of claim 1 wherein said hydrophilic polymer inside said nanopores of said support membrane is selected from the hydrophilic polymer inside said nanopores of said support membrane are selected from the group consisting of chitosan, sodium carboxylmethyl-chitosan, carboxylmethyl-chitosan, hyaluronic acid, sodium hyaluronate, carbopol, polycarbophil calcium, poly(acrylic acid) (PAA), poly(methacrylic acid) (PMA), sodium alginate, alginic acid, poly(vinyl alcohol) (PVA), poly(ethylene oxide) (PEO), poly(ethylene glycol) (PEG), poly(vinylpyrrolidone) (PVP), gelatin, carrageenan, sodium lignosulfonate, and mixtures thereof.

5. The facilitated transport membrane of claim 1 wherein said nanoporous polyethersulfone/ polyvinylpyrrolidone blend support membrane comprising hydrophilic polymers has a carbon nanoporous polyethersulfone/ polyvinylpyrrolidone blend support membrane comprising hydrophilic polymers inside the nanopores on a membrane surface has a carbon dioxide permeance of ≤700 GPU and a carbon dioxide/methane selectivity of <5 at 50° C. under 500-1000 psig 10% CO2/90% CH4 mixed gas feed pressure.

6. The facilitated transport membrane of claim 1 wherein the hydrophilic polymer coating layer comprises a hydrophilic polymer selected from the group consisting of chitosan, sodium carboxylmethyl-chitosan, carboxylmethyl-chitosan, hyaluronic acid, sodium hyaluronate, carbopol, polycarbophil calcium, poly(acrylic acid) (PAA), poly(methacrylic acid) (PMA), sodium alginate, alginic acid, poly(vinyl alcohol) (PVA), poly(ethylene oxide) (PEO), poly(ethylene glycol) (PEG), poly(vinylpyrrolidone) (PVP), gelatin, carrageenan, sodium lignosulfonate, and mixtures thereof.

7. The facilitated transport membrane of claim 1 wherein the metal salts are silver salts or copper salts.

8. The facilitated transport membrane of claim 1 wherein the hydrophilic polymer in the hydrophilic polymer coating layer is chitosan, and the hydrophilic polymer inside the nanopores of the support membrane is sodium alginate or sodium hyaluronate.

* * * * *